Sept. 5, 1939.  M. A. SMITH  2,172,073
VALVE SEAT FOR FAUCETS
Filed Feb. 23, 1937
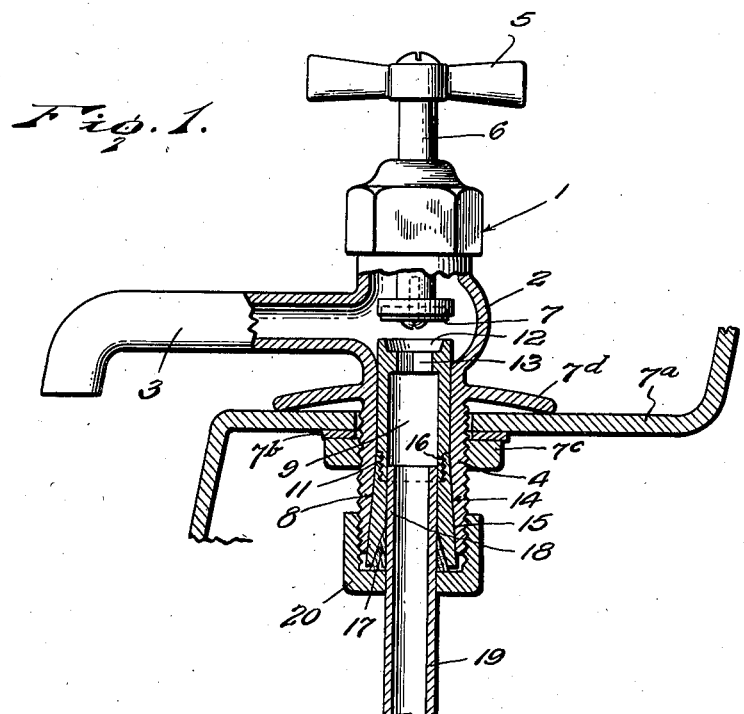
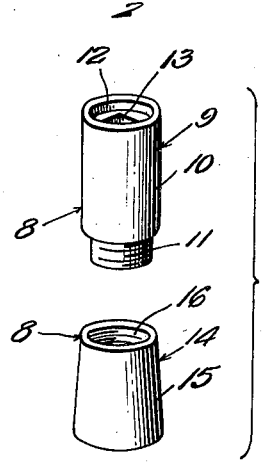
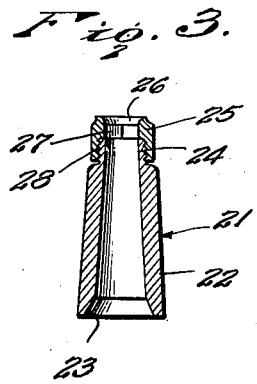
Inventor
Mace A. Smith.
By Lacey & Lacey,
Attorneys Patented Sept. 5, 1939

2,172,073

UNITED STATES PATENT OFFICE 2,172,073

VALVE SEAT FOR FAUCETS

Mace A. Smith, Portland, Oreg.

Application February 23, 1937, Serial No. 127,300

1 Claim. (Cl. 251—167)

This invention relates to an improved valve seat for faucets and seeks, among other objects, to provide a device of this character which may be readily removed so that repair and replacement thereof may be effected with the utmost facility.

Another object of the invention is to provide a valve seat which will be formed of a pair of sections so that it may be easily removed from the faucet and yet will fit snugly in said faucet in operative position, one section of the seat being formed with a squared opening and a substantially straight wall to permit ready removal through either the top or bottom of the faucet by a suitable tool.

And a further object of the invention is to provide a valve seat which will be simple in construction and easy to install.

Other and incidental objects of the invention, not specifically mentioned hereinabove, will render themselves apparent as the description of said invention proceeds.

My improved valve seat is illustrated in the accompanying drawing wherein:

Figure 1 is a vertical sectional view of a faucet with my improved valve seat in operative position therein.

Figure 2 is a detail perspective view of the valve seat, showing the sections in position but not being screwed together.

Figure 3 is a vertical sectional view showing a slight modification of the invention.

Referring now more particularly to the figures of the accompanying drawing, wherein like numerals will be seen to designate like parts throughout said figures, the numeral 1 indicates, in general, a faucet which is provided with a body 2 having the usual discharge pipe 3 and neck or lower portion 4 which is externally threaded throughout its length. The faucet is provided with a conventional handle 5 and stem 6 which terminates at its lower end within the body with a valve 7, which valve is preferably screwed in place in the lower end of the stem 6. The faucet is adapted to be secured in any desired position and is shown mounted on a portion 7a of a conventional wash basin. A packing washer 7b surrounds the lower portion 4 adjacent the lower surface of the portion 7a and is secured in place by a clamping nut 7c which cooperates with a flange 7d on the faucet at the upper side of the portion 7a for securing the faucet in place.

In carrying the invention into effect, I employ a valve seat which is indicated in general by the numeral 8 and includes an upper section 9 provided with a substantially straight outer wall 10. The section 9 is reduced at its lower end portion to define an externally threaded portion 11 and said section 9 is further provided, at its upper end portion, with a seat 12 adapted to be engaged by the valve 7 in closed position for cutting off flow of liquid through the valve seat 8 to the discharge pipe 3. The section 9 is provided at a point slightly beneath the seat 12 with a squared opening 13 which is adapted for engagement by a suitable tool for permitting removal of the section in a manner to be presently described. The valve seat is provided with a lower portion 14 which is formed with a substantially frusto-conical or slightly upwardly tapered outer wall 15 internally threaded at 16 to removably receive the externally threaded portion 11 of the section 9. The section 14, as seen in position in Figure 1, extends slightly below the lower end of the portion 4 and is provided with an enlarged lower end opening 17 for receiving the upper end portion 18 of an inflow pipe 19. The upper end portion 18 is held in place in the section 14 of the valve seat 8 by means of suitable packing. A coupling 20 is screwed on the externally threaded lower portion 4 of the faucet 1 and aids in retaining the packing in place so that the inflow pipe will be effectively connected with the faucet. Attention is called to the fact that, inasmuch as the outer wall 15 is slightly upwardly tapered, it will be permitted to seat tightly on the lower portion 4.

The device is shown in proper operative position in Figure 1 of the drawing and is placed in that position either by screwing the sections 9 and 14 together and inserting the entire valve seat upwardly through the lower portion 4 of the faucet 1, or the upper section 9 may be inserted, after removal of the handle 5 and stem 6, through the top of the faucet and into the lower section which is inserted from the bottom upwardly in the lower portion 4. The sections are tightly screwed together and the frusto-conical wall 15 of the section 14 will engage snugly against the inner surface of the portion 4 so that my improved valve seat will be properly centered in the lower portion and the seat 12 will be disposed in position for engagement by the valve 7. The upper end portion 18 of the pipe 19 is inserted in the opening 17. Packing is inserted and the coupling 20 screwed on the lower end of the portion 4 so that the inflow pipe will be securely mounted in the faucet 1 and the valve seat also effectively positioned in said faucet. It will be understood that rotation of the handle 5 will effectually engage the valve 7 with the valve seat 12 for controlling flow of liquid through the faucet. The squared opening 13 will permit ready engagement of a suitable tool for permitting removal of the section 9 when wear on the seat 12, necessitating repair or replacement of said seat, has taken place. It is particularly pointed out that, as the section 9 may be removed through the top of the faucet, it will not be necessary to disconnect the inflow pipe 19 from the faucet. Moreover, if it should be desired to remove the seat from the faucet without removing the handle 5 and stem 6, said seat may be readily displaced from the faucet by merely disconnecting the coupling 20, removing the packing, and disengaging the upper end portion 18 of the pipe 19 from the opening 17. It is believed that it will be understood that I have provided a simple and highly efficient valve seat which will permit quick installation in faucets so that a great saving of liquids which would otherwise be lost by faulty and leaking valve seats, will be effected.

In the modification of the invention shown in Figure 3 of the drawing, the numeral 21 indicates a valve seat which includes a relatively large lower section 22 tapered upwardly throughout its length so that it will assume a substantially frusto-conical contour. The section 22 is provided with an enlarged beveled opening 23 at its lower end portion and said section is formed with a reduced externally threaded upper end portion 24. The upper end portion 24 is adapted to removably receive a valve seat section 25 which has a seat 26 thereon. At a point beneath the seat 26 there is disposed a squared opening 27 which is adapted for engagement by a suitable tool so that the valve seat section may be unscrewed from the externally threaded upper end portion 24 of the section 22, it being understood that the valve seat section is formed at its lower end portion with internal threads 28. The valve seat section 22 of this form of the invention is adapted to be fitted into the bottom of the lower portion 4 of the faucet 1 and is adapted to receive therein the upper end portion 18 of the inflow pipe 19. Packing and the coupling 20 will serve to retain this form of the invention in place in the faucet. The section 22 may not be removed through the top of the faucet but it will be clearly seen that the valve seat section 25 may be removed in this manner. The operation of this form of the invention is identical with that of the preferred form aside from the above noted features.

Having thus described the invention, what I claim is:

In combination with a faucet having a body and an externally threaded lower inlet portion, a valve seat including companion upper and lower sections to be disposed in said lower inlet portion, said faucet having an opening in its top opposite said inlet through which the upper section of the seat may be removed, a valve stem and disk mounted in said opening, said upper section having a substantially cylindrical outer wall having an external diameter small enough to permit removal in either direction from said lower portion and having a seat face at its upper end to be engaged by the valve disk for controlling fluid flow through the faucet, said lower section being provided with an enlarged frusto-conical outer wall for cooperation with a complemental inner wall of the inlet and adapted for receiving an inflow pipe, and a coupling screwed on the lower portion of the faucet and cooperating with packing for retaining the inflow pipe in position in said enlarged lower end section.

MACE A. SMITH.